United States Patent
Tsuruta et al.

(10) Patent No.: US 9,796,357 B2
(45) Date of Patent: Oct. 24, 2017

(54) IGNITION SWITCH

(71) Applicant: KABUSHIKI KAISHA TOKAI RIKA DENKI SEISAKUSHO, Aichi (JP)

(72) Inventors: Hiroshi Tsuruta, Aichi (JP); Hiroki Mizushima, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 172 days.

(21) Appl. No.: 14/604,037

(22) Filed: Jan. 23, 2015

(65) Prior Publication Data

US 2015/0217724 A1 Aug. 6, 2015

(30) Foreign Application Priority Data

Jan. 31, 2014 (JP) ................................. 2014-017786

(51) Int. Cl.
  *B60R 25/04* (2013.01)
  *H01H 27/06* (2006.01)
  *H01H 27/08* (2006.01)

(52) U.S. Cl.
  CPC ........... *B60R 25/04* (2013.01); *H01H 27/063* (2013.01); *H01H 27/08* (2013.01)

(58) Field of Classification Search
  CPC ....... B60R 25/04; H01H 27/063; H01H 27/08
  USPC .......................................... 200/43.03–43.11
  See application file for complete search history.

(56) References Cited

U.S. PATENT DOCUMENTS

| | | | |
|---|---|---|---|
| 6,327,882 B1* | 12/2001 | Canard | B60R 25/02118 70/186 |
| 6,568,228 B2* | 5/2003 | Hasegawa | B60R 25/04 70/245 |
| 6,756,698 B2* | 6/2004 | Shamoto | B60R 25/04 307/10.1 |
| 2001/0048246 A1 | 12/2001 | Shamoto et al. | |

FOREIGN PATENT DOCUMENTS

| | | |
|---|---|---|
| JP | 03-88873 | 9/1991 |
| JP | 06-6652 | 1/1994 |
| JP | 2001-277893 | 10/2001 |
| JP | 2003-343406 | 12/2003 |

OTHER PUBLICATIONS

Office Action issued in Japan Counterpart Patent Appl. No. 2014-017786, dated May 30, 2017, along with an English translation thereof.

* cited by examiner

*Primary Examiner* — Renee Luebke
*Assistant Examiner* — Lheiren Mae A Caroc
(74) *Attorney, Agent, or Firm* — Greenblum & Bernstein, P.L.C.

(57) ABSTRACT

An ignition switch includes a rotor into which a vehicle key can be inserted, a switch body rotationally accommodating the rotor, and a key interlock mechanism integrally coupled to the switch body. The key interlock mechanism prevents removal of the vehicle key when the vehicle is traveling.

9 Claims, 6 Drawing Sheets

(LOCK)

(ACC)

(ON)

(START)

(ACC)

(LOCK)

(ACC)

(ON)

(START)

(ACC)

IGNITION SWITCH

CROSS-REFERENCE TO RELATED APPLICATIONS

This application is based upon and claims the benefit of priority from prior Japanese Patent Application No. 2014-017786, filed on Jan. 31, 2014, the entire contents of which are incorporated herein by reference.

FIELD

The present invention relates to an ignition switch.

BACKGROUND

A vehicle includes an ignition switch. For example, the ignition switch includes an ignition rotor. A vehicle key is inserted into the ignition rotor through a key cylinder. In accordance with positions of the ignition rotor, the ignition switch starts and stops the engine and activates and deactivates electric components of the vehicle.

To improve vehicle safety, an ignition switch may be used together with a key interlock mechanism that prevents a vehicle key from being removed when the vehicle is traveling. Japanese Laid-Open Patent Publication No. 2003-343406 describes a key interlock mechanism that includes a camshaft, which rotates integrally with an ignition rotor.

However, the structure described in the above publication separates the ignition switch and the key interlock mechanism. Such a structure needs to obtain space in the vehicle for each of the ignition switch and the key interlock mechanism. This enlarges the area occupied by the key interlock mechanism in the vehicle.

SUMMARY

One aspect of an ignition switch is capable of starting and stopping an engine of a vehicle and activating and deactivating an electric component of the vehicle. The ignition switch includes a rotor into which a vehicle key is insertable, a switch body rotationally accommodating the rotor, and a key interlock mechanism integrally coupled to the switch body. The key interlock mechanism is configured to prevent removal of the vehicle key when the vehicle is traveling.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

First Embodiment

A first embodiment of an ignition switch 20 (hereafter, referred to as the "IGSW") will now be described.

Figure 1:
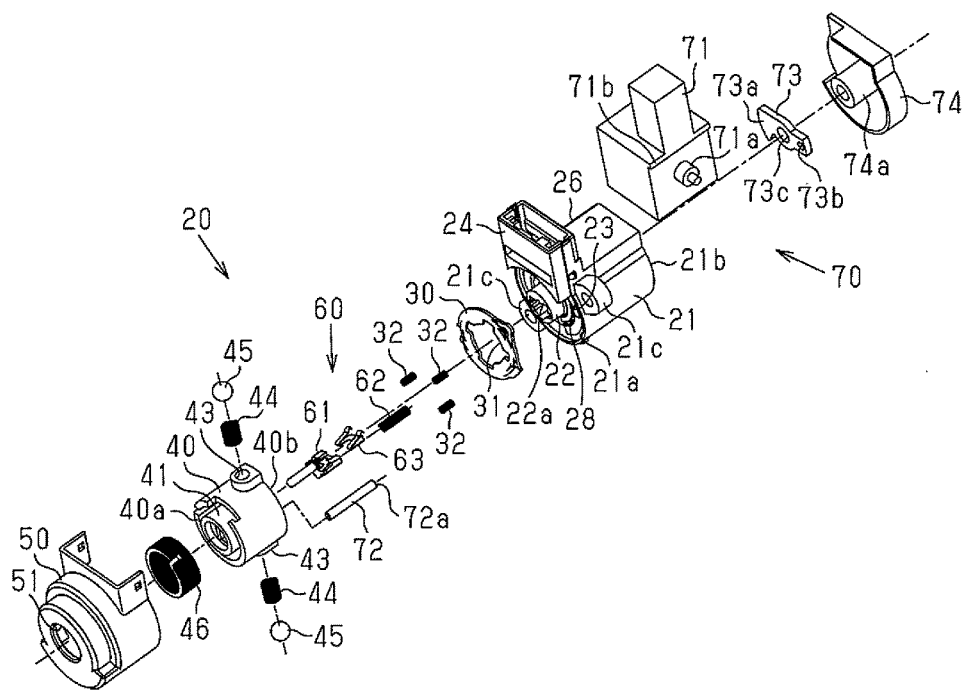
FIG. 1 is a perspective view showing a first embodiment of an ignition switch that includes a key interlock mechanism.

The IGSW 20 shown in FIG. 1 is installed in a vehicle and inserted into a key cylinder. By rotating the IGSW 20, the engine of the vehicle can be started and stopped and electric components in the vehicle can be activated and deactivated.

Figure 2:
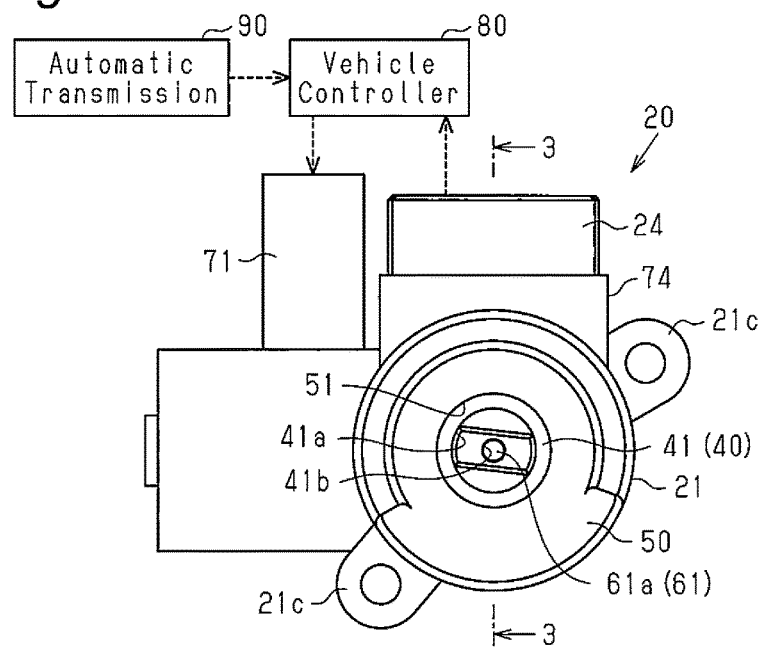
FIG. 2 is a front view showing the ignition switch of FIG. 1.

As shown in FIGS. 1 and 2, the IGSW 20 includes a tubular switch body 21 having an electrical contact structure. The switch body 21 includes a shaft 22, which serves as a rotor rotation shaft. The shaft 22 projects toward a side (left side in FIG. 1) of one end 21a of the switch body 21. The shaft 22 includes an accommodation hole 22a that opens toward a distal end of the shaft 22. A contact portion 23, which includes a plurality of fixed contact points, is arranged around the shaft 22. The contact portion 23 of the present embodiment has four fixed contact points located in correspondence with the four rotor positions of "LOCK", "ACC", "ON" and "START".

A connector 24 is formed integrally with the switch body 21 at a radially outer side of the shaft 22. The connector 24 is electrically connected to a vehicle controller 80, which is located outside the IGSW 20. The connector 24 electrically connects the vehicle controller 80 and each fixed contact point of the contact portion 23. The IGSW 20 is fastened to a key cylinder (not shown) with screws or the like inserted through two fastening portions 21c formed in the switch body 21.

Additionally, an ignition rotor 40 (hereafter, referred to as the IG rotor), which serves as a cylindrical rotor, and a switch cover 50 are coupled to the end 21a of the switch body 21 with a discoid movable contact portion 30 located in between. The movable contact portion 30 is electrically connectable to the contact portion 23.

The IG rotor 40 includes a cylindrical rotating portion 41. The rotating portion 41 projects toward a side (left side in FIG. 1) of one end 40a of the IG rotor 40. A distal end of the rotating portion 41 includes a key inlet 41a. A vehicle key can be inserted into the key inlet 41a. An inner end of the key inlet 41a includes a through hole 41b that is in communication with a shaft receptacle 42, which opens toward a side (right side in FIG. 1) of the other end 40b of the IG rotor 40.

The rotating portion 41 of the IG rotor 40 is inserted into a rotor hole 51 of the switch cover 50. The shaft 22 of the switch body 21 is inserted into the shaft receptacle 42 through a shaft hole 31 of the movable contact portion 30. The IG rotor 40 is coupled to the switch body 21 and can rotate integrally with the movable contact portion 30.

The IG rotor 40 includes two ball holes 43 at the radially outer side. A spring 44 and a ball 45 are sequentially inserted into each of the ball holes 43. When the IG rotor 40 moves, the balls 45 move along an inner wall of the switch cover 50. This produces clicks, which can be perceived by the user.

Three springs 32 are arranged between the movable contact portion 30 and the IG rotor 40. The springs 32 urge the movable contact portion 30 toward the fixed contact points of the contact portion 23. Additionally, a return spring 46 is arranged around the rotating portion 41 of the IG rotor 40. The return spring 46 rotationally urges the IG rotor 40 so that the rotor position returns from the "START" position to the "ON" position.

Figure 3:
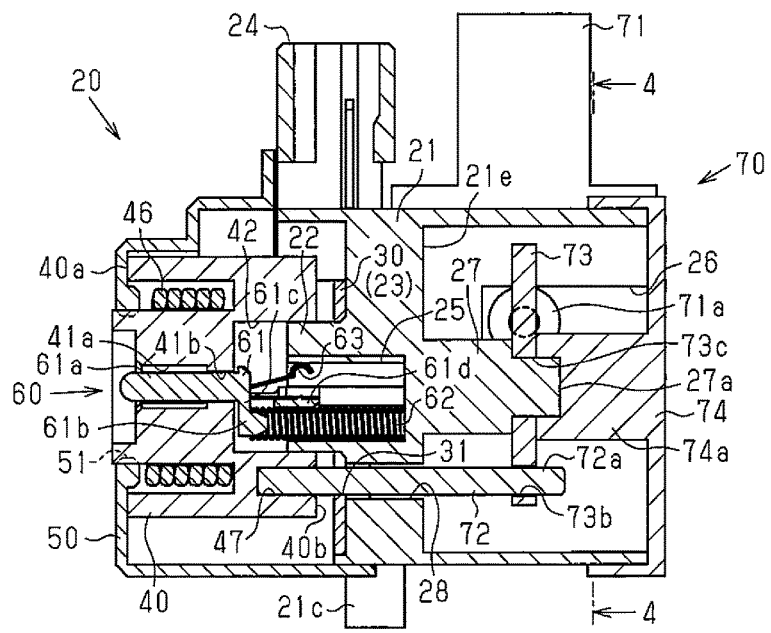
FIG. 3 is a cross-sectional view showing the cross-sectional structure of FIG. 2 taken along line 3-3.

As shown in FIGS. 1 and 3, a warning switch 60 (hereafter, referred to as the WSW) is accommodated in the accommodation hole 22a of the IGSW 20, the through hole 41b of the IG rotor 40, and the key inlet 41a. The WSW 60 detects whether or not the vehicle key is inserted into the key inlet 41a through the key cylinder (not shown). The WSW 60 includes a hook-shaped switch rod 61. The switch rod 61 includes a long rod portion 61a, a short rod portion 61b, and a step 61c. The long rod portion 61a and the short rod portion 61b, which have different lengths, are connected by the step 61c.

The long rod portion 61a is inserted from the end 40b of the IG rotor 40 into the through hole 41b and guides the axial movement of the switch rod 61. The long rod portion 61a projects from the key inlet 41a toward the outer side when the step 61c is the most proximate to an inner wall of the shaft receptacle 42 (through hole 41b). The spring 62 is arranged around the short rod portion 61b. The spring 62 urges the switch rod 61 toward a position where the step 61c is proximate to the inner wall of the shaft receptacle 42.

The switch rod 61 also includes a seat 61d, which is parallel to the short rod portion 61b. A switch 63, which includes two movable contact points, is fixed to the seat 61d.

The interior of the accommodation hole 22a includes a contact portion 25. The contact portion 25 includes two legs having different lengths and is electrically connected to the connector 24 by the legs. When the two legs of the contact portion 25 are in contact with the two movable contact points of the switch 63, the contact portion 25 is in an on state. When only one of the two movable contact points of the switch 63 is in contact with one of the two legs of the contact portion 25, the contact portion 25 is in an off state.

As shown in FIG. 3, when the vehicle key is removed from the key inlet 41a, the switch rod 61 is the most proximate to the inner wall of the shaft receptacle 42 due to the urging force of the spring 62. In this case, the contact portion 25 is in the off state. The vehicle controller 80 detects that the vehicle key is removed.

The vehicle key pushes the switch rod 61 when inserted into the key inlet 41a. Thus, the switch rod 61 is separated from the inner wall of the shaft receptacle 42 against the urging force of the spring 62. In this case, the contact portion 25 is switched to the on state. The vehicle controller 80 detects that the vehicle key is inserted.

As shown in FIG. 3, a key interlock mechanism 70 is coupled to the other end 21b (right side in FIG. 1) of the switch body 21. The key interlock mechanism 70 prevents the vehicle key from being removed when the vehicle is travelling. The key interlock mechanism 70 includes a solenoid 71 including a plunger 71a. The plunger 71a moves between an extension position and a retraction position. The solenoid 71 is electrically connected to the vehicle controller 80 located outside the IGSW 20. When the solenoid 71 is energized and activated by the vehicle controller 80, the plunger 71a extends toward the switch body 21. When the solenoid 71 is deactivated, the plunger 71a is retracted in the solenoid 71 and separated from the switch body 21. The solenoid 71 includes a positioning portion 71b at a position opposing the switch body 21. The plunger 71a and the positioning portion 71b engage an engagement portion 26 formed on a side surface of the switch body 21. This couples the solenoid 71 to the switch body 21.

The end 21b of the switch body 21 includes a lock pivot shaft 27. The switch body 21, which is arranged between the lock pivot shaft 27 and the shaft 22, includes a separation plate 21e that separates an accommodation region of the IG rotor 40 from an accommodation region of the key interlock mechanism 70. The separation plate 21e is formed integrally with the lock pivot shaft 27 and the shaft 22. The separation plate 21e includes a slide hole 28 that is arc-shaped in the circumferential direction (e.g., refer to FIG. 4A). The arc length of the slide hole 28 corresponds to the range where the IG rotor 40 can rotate.

The end 40b of the IG rotor 40 includes a pin hole 47. A pin 72, which functions as a transmission, is fitted to the pin hole 47. Thus, the pin 72 can rotate integrally with the IG rotor 40 when the IG rotor 40 rotates. The pin 72 is inserted into the slide hole 28 through the shaft hole 31 of the movable contact portion 30. The pin 72 can slide along the slide hole 28 when the IG rotor 40 rotates. A distal end 72a of the pin 72 projects more than a distal end 27a of the lock pivot shaft 27 when the IGSW 20 is assembled.

A lock cover 74, which guards the key interlock mechanism 70, is coupled to the end 21b of the switch body 21 with a flat lock lever 73 located in between. The lock lever 73 functions as a lock. One end of the lock lever 73 includes a hook-shaped claw 73a that can be hooked to the plunger 71a. The other end of the lock lever 73 includes a pin hole 73b through which the pin 72 is inserted. A central portion of the lock lever 73 includes an insertion hole 73c through which the distal end 27a of the lock pivot shaft 27 is inserted.

The claw 73a extends from the axis of the lock lever 73 in the radial direction. The length of the claw 73a is set so that the claw 73a is hooked to the plunger 71a when the plunger 71a of the solenoid 71 extends but not hooked to the plunger 71a when the plunger 71a is retracted.

The pin hole 73b is located in a position where the pin 72 can be inserted into the pin hole 73b when the IGSW 20 is assembled. An inner surface of the lock cover 74 includes a tubular bearing 74a, which projects toward the lock lever 73 and has an outer diameter that is larger than the inner diameter of the insertion hole 73c.

When the distal end 27a of the lock pivot shaft 27 is inserted into the insertion hole 73c and the bearing 74a, the lock lever 73 is pivotally coupled to the switch body 21. When the pin 72 is inserted into the pin hole 73b, the lock lever 73 pivots integrally with the pin 72 when the IG rotor 40 rotates. In other words, the pin 72 converts the rotation of the IG rotor 40 to the pivoting of the lock lever 73.

The IGSW 20 switches contact states to the four rotor positions at "LOCK", "ACC", "START", and "ON" based on the rotation of the IG rotor 40. Further, the IGSW 20 shifts the position of the lock lever 73 in correspondence with each contact state (rotor position).

Figure 4A:
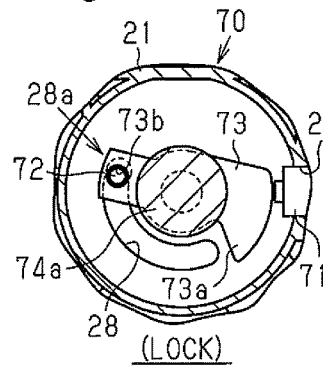
FIGS. 4A to 4E are cross-sectional views showing the cross-sectional structure of FIG. 3 taken along line 4-4 in correspondence with operational states of the key interlock mechanism.

In FIG. 4A, the "LOCK" rotor position corresponds to a condition in which the engine of the vehicle is stopped and the electric components in the vehicle are deactivated. When the IG rotor 40 is at the "LOCK" position, the vehicle key can be inserted into and removed from the key cylinder (i.e., IG rotor 40). When the rotor position is "LOCK", the pin 72 is located at a first position 28a (upper left end in FIG. 4A) of the slide hole 28 and the claw 73a of the lock lever 73 is opposed to the plunger 71a.

Figure 4B:
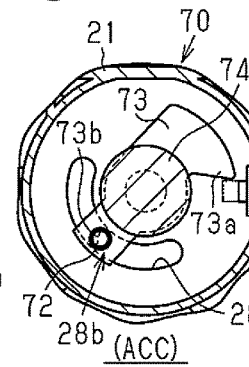

As shown in FIG. 4B, when the vehicle key is inserted into the key cylinder and the IG rotor 40 is rotated to the "ACC" rotor position, power is supplied to the electric components of the vehicle. The engine remains stopped. When the IG rotor 40 is rotated from "LOCK" to "ACC", the pin 72 moves to a second position 28b along the slide hole 28. When the rotor position is "ACC", the claw 73a of the lock lever 73 is separated from the plunger 71a. This allows the plunger 71a to extend.

Figure 4C:
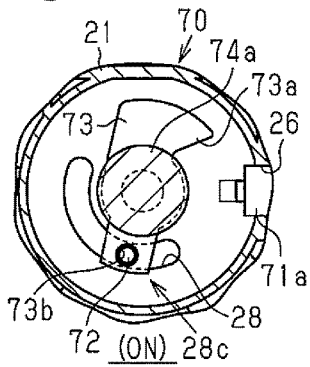

As shown in FIG. 4C, when the IG rotor 40 is further rotated to the "ON" rotor position with the vehicle key in the key cylinder, the engine is switched to an on state. The power is continuously supplied to the electric components of the vehicle. When the IG rotor 40 is rotated from "ACC" to "ON", the pin 72 moves to a third position 28c along the slide hole 28. When the rotor position is "ON", the claw 73a of the lock lever 73 is further separated from the plunger 71a.

Figure 4D:
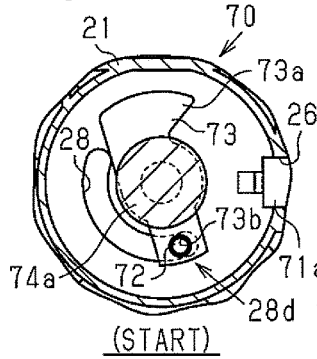

As shown in FIG. 4D, when the IG rotor 40 is further rotated to the "START" rotor position with the vehicle key in the key cylinder, the engine is started. When the IG rotor 40 is rotated from "ON" to "START", the pin 72 moves to a fourth position 28d (lower right in FIG. 4D) along the slide hole 28. When the rotor position is "START", the claw 73a of the lock lever 73 is the farthest from the plunger 71a.

As shown in FIG. 2, the vehicle controller 80 detects the position of the IG rotor 40 and the shift position of an automatic transmission 90 of the vehicle. The vehicle controller 80 controls activation and deactivation of the solenoid 71 in accordance with detection results of the rotor position and the shift position. Regarding the shift position, the present embodiment detects whether or not the shift position is at the park position (stop position), that is, the vehicle is still.

When the vehicle is still, the vehicle controller 80 deactivates the solenoid 71 and retracts the plunger 71a as indicated by solid lines in FIGS. 4A to 4D regardless of the rotor position of the IG rotor 40. When the plunger 71a is retracted, the claw 73a of the lock lever 73 does not interfere with the plunger 71a. This allows the lock lever 73 to pivot to the "LOCK" rotor position. Thus, the vehicle key can be removed and inserted.

When the vehicle is not still and the IG rotor 40 is in a rotor position other than "LOCK", the vehicle controller 80 activates the solenoid 71 and extends the plunger 71a as indicated by broken lines in FIGS. 4B to 4D.

Figure 4E:
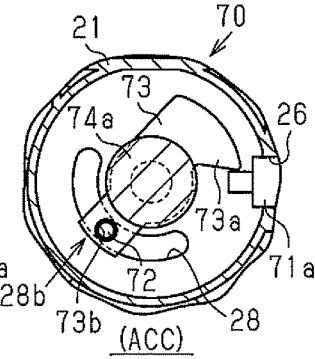

FIG. 4E shows that the plunger 71a is extended, for example, when the rotor position is "ACC". Under this condition, the claw 73a interferes with the plunger 71a. This restricts the pivoting of the lock lever 73 to the "LOCK" rotor position, that is, the rotation of the IG rotor 40 to a position where the vehicle key can be removed. Thus, the vehicle key is in the key interlock mode. In the present embodiment, the plunger 71a functions as a removal prevention portion.

The operation of the IGSW 20 will now be described.

As shown in FIGS. 1 to 3, the key interlock mechanism 70 is integrally coupled to the switch body 21. This minimizes space for the IGSW 20 and the key interlock mechanism 70.

The switch body 21 includes the contact portion 23, which is electrically connected to the IG rotor 40. When the key interlock mechanism 70 is integrally coupled to the switch body 21 in such a structure, it is not preferred from the viewpoint of the vehicle safety to arrange the key interlock mechanism 70 including the solenoid 71, which is an electric device, near the contact portion 23.

Taking into consideration such a point, the key interlock mechanism 70 is coupled to a side of the switch body 21 that is opposite to the IG rotor 40. In this manner, the key interlock mechanism 70 is coupled to the switch body 21 at a location separated from the IG rotor 40. Thus, the key interlock mechanism 70 is also separated from the contact portion 23.

The IG rotor 40 includes the pin 72, which moves in the circumferential direction and transmits the rotation of the IG rotor 40 to the lock lever 73 when the IG rotor 40 rotates. Thus, even when the key interlock mechanism 70 is separated from the IG rotor 40 and coupled to the switch body 21, the solenoid 71 can be controlled by using the pin 72 to transmit the rotor position of the IG rotor 40 to the key interlock mechanism 70.

The key interlock mechanism 70 includes the lock lever 73, which is coupled to the pin 72. The lock lever 73 pivots as the IG rotor 40 rotates. Thus, the rotation of the IG rotor 40 is directly transmitted to the lock lever 73, that is, the key interlock mechanism 70. The key interlock mechanism 70 restricts or allows the pivoting of the lock lever 73 by activating or deactivating the solenoid 71 in accordance with the rotation position of the IG rotor 40.

The present embodiment has the advantages described below.

(1) The key interlock mechanism 70 is integrally coupled to the switch body 21. This minimizes the space for the IGSW 20 and the key interlock mechanism 70. Thus, enlargement of the space for these devices can be limited compared to when a key interlock mechanism is separately arranged.

(2) The key interlock mechanism 70 is separated from the IG rotor 40 and coupled to the switch body 21. Thus, the key interlock mechanism 70 is arranged in a location separated from the contact portion 23. This improves the vehicle safety even when the key interlock mechanism 70 includes an electric device such as the solenoid 71.

(3) Even when the key interlock mechanism 70 is separated from the IG rotor 40 when coupled, the rotation position of the IG rotor 40, that is, the rotor position, is transmitted to the key interlock mechanism 70 through the pin 72. Thus, a simple structure can be used to prevent the removal of the vehicle key in accordance with the rotor position.

(4) The key interlock mechanism 70 includes the lock lever 73, which pivots in cooperation with the rotation of the IG rotor 40 transmitted through the pin 72. This limits motion loss of the lock lever 73 and realizes the structure that accurately prevents the removal of the vehicle key.

(5) The WSW 60 is integrally coupled to the switch body 21. This minimizes the space for the IGSW 20 and the WSW 60. Thus, the space for these devices can be reduced compared to when a warning switch is separately arranged.

The WSW 60 is accommodated in the accommodation hole 22a of the switch body 21. Thus, the WSW 60 is not in contact with the contact portion 23 of the IG rotor 40. This improves the vehicle safety even when the WSW 60 having an electrical contact structure is integrally coupled to the switch body 21.

Second Embodiment

A second embodiment of an ignition switch will now be described. The second embodiment differs from the first embodiment mainly in the structure of the key interlock mechanism 70. Therefore, the same reference numerals are given to those components that are the same as the corresponding components in the first embodiment. Such components will not be described in detail.

Figure 5:
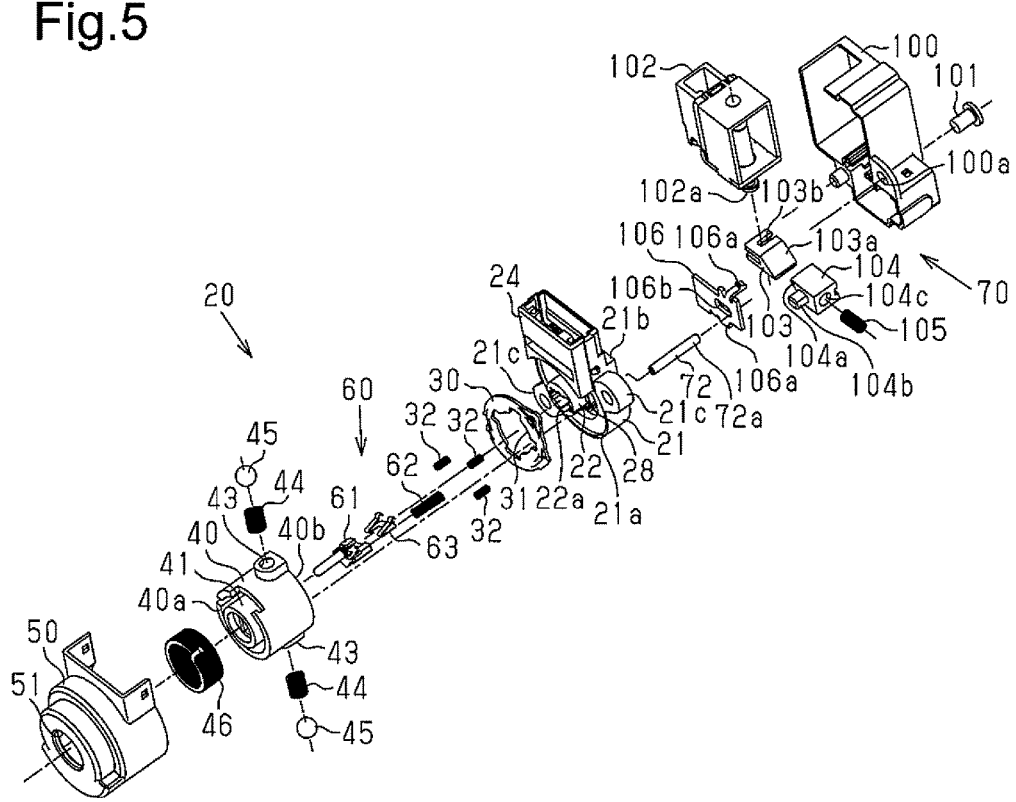
FIG. 5 is a perspective view showing a second embodiment of an ignition switch that includes a key interlock mechanism.
Figure 7:
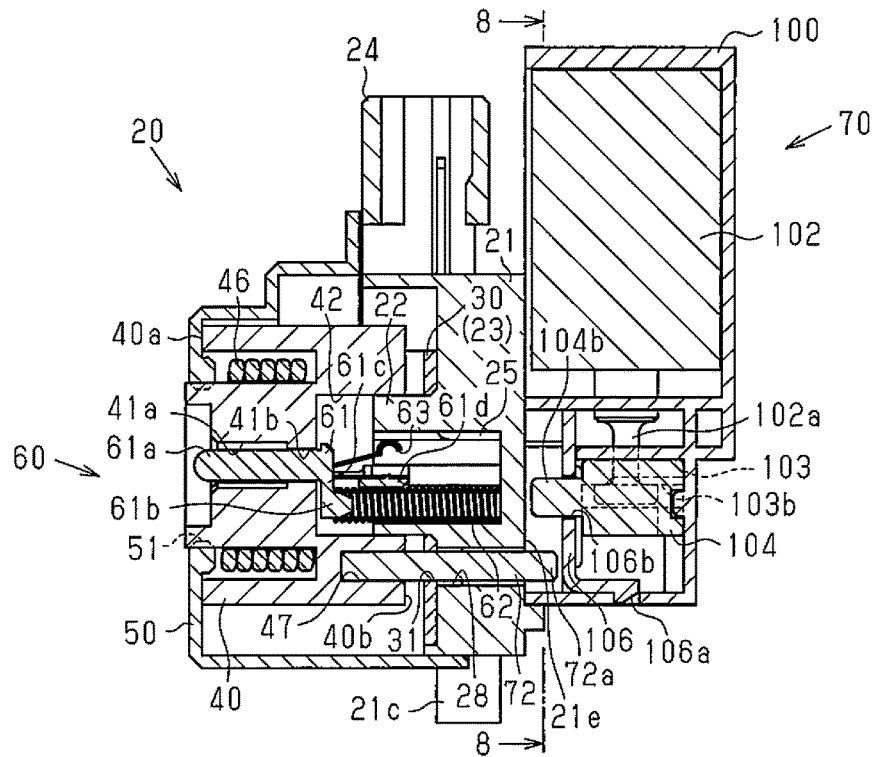
FIG. 7 is a cross-sectional view showing the cross-sectional structure of FIG. 6 taken along line 7-7.
Figure 8A:
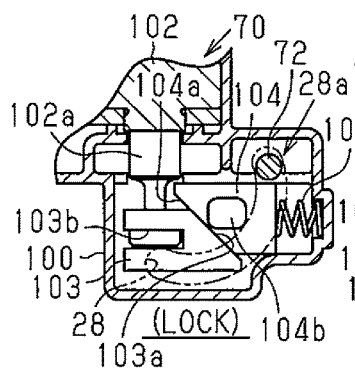
FIGS. 8A to 8E are cross-sectional views showing the cross-sectional structure of FIG. 7 taken along line 8-8 in correspondence with operational states of the key interlock mechanism.

As shown in FIGS. 5 and 7, a switch body 21 of the second embodiment has a thickness that is slightly greater than the connector 24. The switch body 21 includes a separation plate 21e that is formed integrally with the shaft 22 and separates the accommodation region of the IG rotor 40 from the accommodation region of the key interlock mechanism 70. The separation plate 21e includes the arc-shaped slide hole 28 (e.g., refer to FIG. 8A).

As shown in FIGS. 5 and 7, the key interlock mechanism 70, which prevents the vehicle key from being removed when the vehicle is travelling, is coupled to the end 21b (right side in FIG. 5) of the switch body 21. Additionally, a lock cover 100, which guards the key interlock mechanism 70, is coupled to the end 21b of the switch body 21. The lock cover 100 is coupled to the switch body 21 by a bolt 101 inserted through a bolt hole 100a. The lock cover 100 accommodates a solenoid 102, a first slider 103, and a second slider 104.

The solenoid 102 includes a plunger 102a, which moves between the extension position and the retraction position. The distal end of the plunger 102a includes a flange. The solenoid 102 is electrically connected to the vehicle controller 80 located outside the IGSW 20. The solenoid 102 retracts the plunger 102a when energized and activated by the vehicle controller 80. When the solenoid 102 is deactivated, the plunger 102a extends.

The first slider 103 includes an inclined slider portion 103a at one end and an engagement groove 103b at the other end. The second slider 104 includes an inclined slider portion 104a at one end and a projection 104b projecting toward the switch body 21 at the other end.

The lock cover 100 accommodates the solenoid 102 so that the movement direction of the plunger 102a is aligned with the extension direction of the connector 24. The plunger 102a engages the engagement groove 103b of the first slider 103. The first slider 103 can be moved integrally with the plunger 102a. The inclined surface of the inclined slider portion 103a is opposed to the plunger 102a. The inclined surface of the inclined slider portion 104a is opposed to the inclined surface of the inclined slider portion 103a.

A slider plate 106 is coupled to the lock cover 100 by two engagement claws 106a. The slider plate 106 includes a plate hole 106b. The projection 104b of the second slider 104 can be inserted through the plate hole 106b.

A spring 105 is arranged between the lock cover 100 and the second slider 104 and inserted into a spring hole 104c of the second slider 104. The spring 105 urges the second slider 104 toward the first slider 103.

As shown in FIG. 7, the distal end 72a of the pin 72 projects more than the end 21b of the switch body 21 when the IGSW 20 is assembled. Also, the projection 104b of the second slider 104 extends toward the basal end of the pin 72 beyond the distal end of the pin 72. However, the distal end of the projection 104b of the second slider 104 does not reach the switch body 21. The width of the plate hole 106b is slightly greater than the width of the projection 104b in a direction in which the second slider 104 moves. The projection 104b, which is inserted into the plate hole 106b, moves to a position that is separated from the orbit of the pin 72 or a position where the projection 104b overlaps the orbit of the pin 72 as the second slider 104 moves.

As shown in FIGS. 8A to 8D, when the plunger 102a of the solenoid 102 extends, the plunger 102a moves the first slider 103 downward. When the first slider 103 moves downward, the urging force of the spring 105 moves the second slider 104 toward the first slider 103 along the inclined slider portion 103a. The movement of the second slider 104 moves the projection 104b to the position that is separated from the orbit of the pin 72, that is, a position where the projection 104b allows the movement of the pin.

Figure 8B:
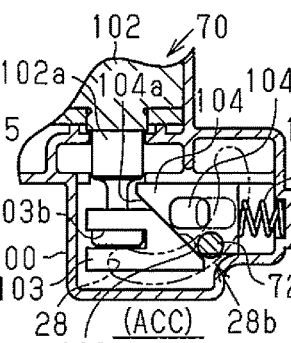
Figure 8C:
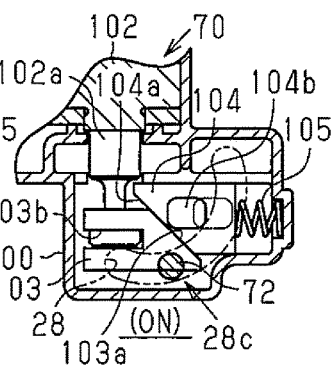
Figure 8D:
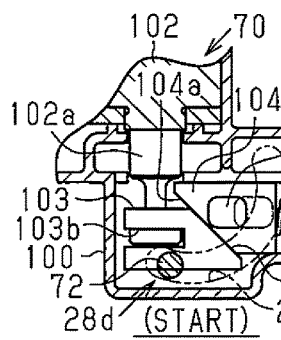
Figure 8E:
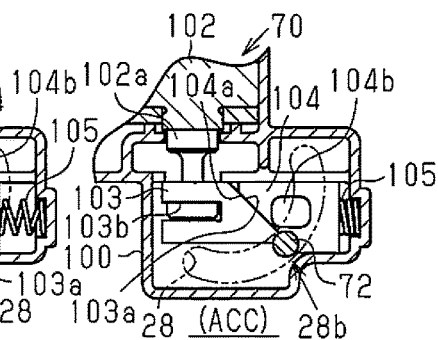

As shown in FIG. 8E, the first slider 103 moves upward when the plunger 102a of the solenoid 102 is retracted. When the first slider 103 moves upward, the second slider 104 moves along the inclined slider portion 103a in a direction in which the second slider 104 is separated from the first slider 103 against the urging force of the spring 105. The movement of the second slider 104 moves the projection 104b to the position where the projection 104b overlaps the orbit of the pin 72, that is, a position where the projection 104b restricts the movement of the pin. Thus, the projection 104b functions as a restriction member.

As indicated by solid lines in FIGS. 8A to 8D, when the vehicle is still, the vehicle controller 80 deactivates the solenoid 102 to extend the plunger 102a regardless of the position of the IG rotor 40. When the plunger 102a is extended, the projection 104b moves to the position that is separated from the orbit of the pin 72. This allows the pin 72 to move to the "LOCK" rotor position. Thus, the vehicle key can be removed and inserted.

As indicated by broken lines in FIGS. 8B to 8D, when the vehicle is not still, the vehicle controller 80 activates the solenoid 102 to retract the plunger 102a when the IG rotor 40 is at a position other than "LOCK". When the plunger 102a is retracted, the projection 104b moves to the position where the projection 104b overlaps the orbit of the pin 72. Thus, the projection 104b restricts the movement of the pin 72, that is, the rotation of the IG rotor 40.

For example, as shown in FIG. 8E, when the vehicle controller 80 retracts the plunger 102a when the rotor position is "ACC", the movement of the pin 72 to the "LOCK" rotor position is restricted by the projection 104b. This results in the key interlock mode that restricts the movement of the pin 72, that is, the rotation of the IG rotor 40 to the "LOCK" rotor position. In the second embodiment, the projection 104b functions as a removal restriction portion.

The second embodiment has the advantages described below in addition to advantages (1) to (3) and (5) of the first embodiment.

(6) The key interlock mechanism 70 restricts the movement of the pin 72 (rotation of the IG rotor 40) by the projection 104b. This structure does not use the lock lever 73 of the first embodiment. This further limits motion loss of the key interlock mechanism 70 and realizes the structure that accurately prevents the removal of the vehicle key.

Figure 6:
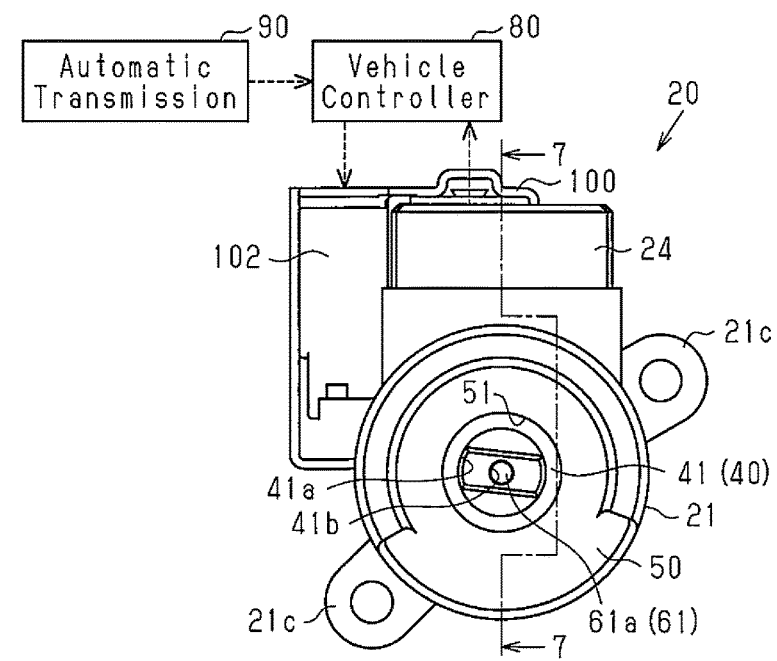
FIG. 6 is a front view showing the ignition switch of FIG. 5.

(7) The lock cover 100 accommodates the solenoid 102 so that the movement direction of the plunger 102a is aligned with the extension direction of the connector 24 (refer to FIG. 6). In this structure, the long side of the solenoid 102 is aligned with the extension direction of the connector 24. This limits enlargement of the IGSW 20.

Third Embodiment

A third embodiment of an ignition switch will now be described. The third embodiment differs from the first embodiment mainly in the structure of the key interlock mechanism 70. Therefore, the same reference numerals are given to those components that are the same as the corresponding components in the first embodiment. Such components will not be described in detail.

Figure 11:
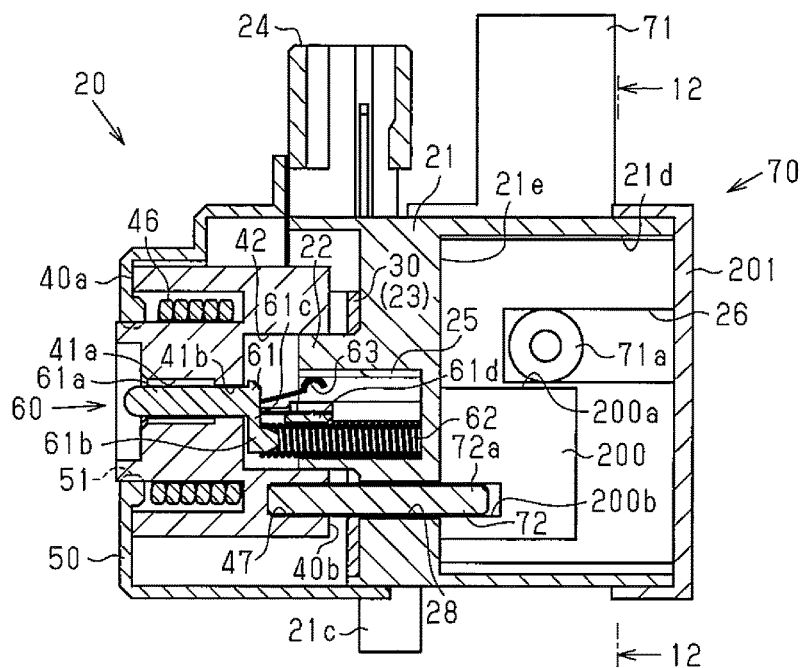
FIG. 11 is a cross-sectional view showing the cross-sectional structure of FIG. 10 taken along line 11-11.

As shown in FIG. 11, in the same manner as the second embodiment, the switch body 21 includes the separation plate 21e that is formed integrally with the shaft 22 and separates the accommodation region of the IG rotor 40 from the accommodation region of the key interlock mechanism 70. The separation plate 21e includes the arc-shaped slide hole 28 (e.g., refer to FIG. 12A). The end 21b of the switch body 21 includes an accommodation portion 21d that accommodates a tetragonal lock block 200, which functions as a lock.

Figure 9:
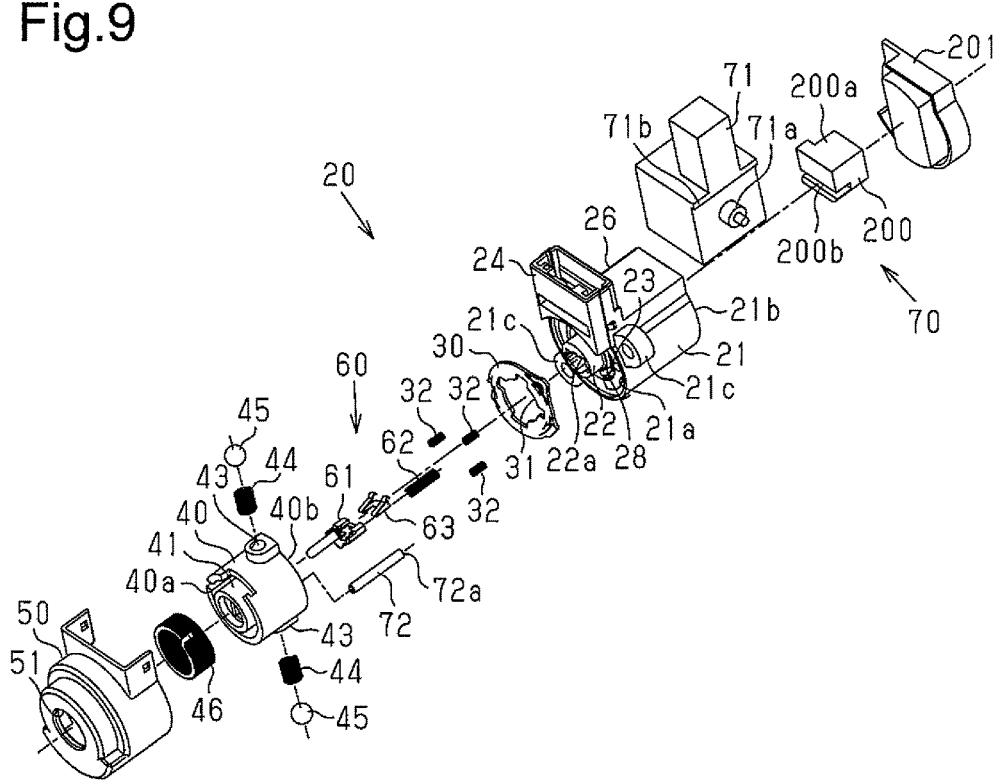
FIG. 9 is a perspective view showing a third embodiment of an ignition switch that includes a key interlock mechanism.
Figure 10:
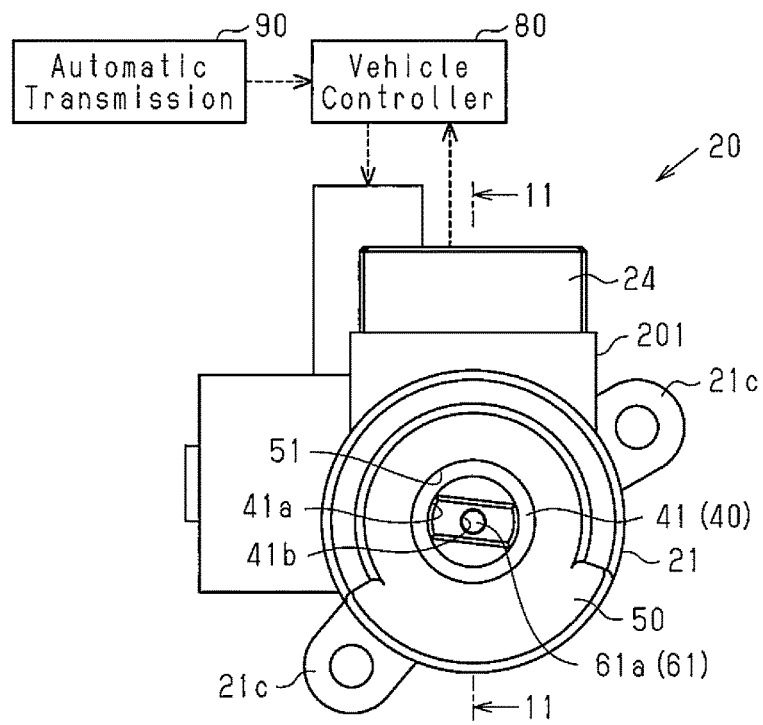
FIG. 10 is a front view showing the ignition switch of FIG. 9.

As shown in FIGS. 9 to 11, in the key interlock mechanism 70 of the third embodiment, the end 21b of the switch body 21 is coupled to a lock cover 201, which accommodates the lock block 200 and guards the key interlock mechanism 70.

The lock block 200 is accommodated in the accommodation portion 21d so that the lock block 200 is movable between a position where the lock block 200 restricts extension of the plunger 71a and a position where the lock block 200 allows extension of the plunger 71a. The plunger 71a of the third embodiment is extended and retracted in a direction vertical to the plane of FIG. 11. Hereafter, the direction in which the plunger 71a extends is referred to as the "plunger extension direction". The movement of the lock block 200 in the plunger extension direction is restricted by the accommodation portion 21d. The lock block 200 moves in a direction that is orthogonal to the plunger extension direction and aligned with the direction in which the connector 24 extends. Hereafter, the direction in which the connector 24 extends is referred to as the "connector extension direction". The accommodation portion 21d guides the movement of the lock block 200 in the connector extension direction. As shown in FIGS. 9 and 12A to 12E, a surface of the lock block 200 that is opposed to the plunger 71a of the solenoid 71 is partially recessed and serves as a hook 200a having a step. When the plunger 71a extends, the plunger 71a may be hooked to the hook 200a of the lock block 200. When the plunger 71a is retracted, the recess formed by the hook 200a may accommodate the plunger 71a. As shown in FIG. 11, a surface of the lock block 200 that corresponds to the switch body 21 includes a pin groove 200b. The pin 72 may be inserted into the pin groove 200b. The pin groove 200b is one example of a converter. The pin groove 200b extends in the plunger extension direction.

As shown in FIG. 11, when the IGSW 20 is assembled, the distal end 72a of the pin 72 is inserted into the pin groove 200b in the accommodation portion 21d of the switch body 21.

As shown in FIGS. 12A to 12D, when the plunger 71a is retracted, the distal end of the plunger 71a is not hooked to the hook 200a of the lock block 200.

Figure 12A:
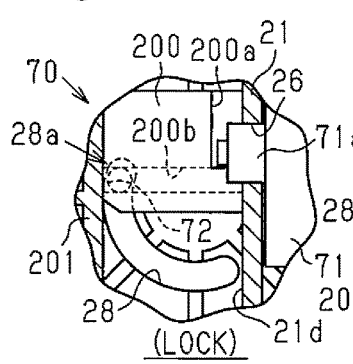
FIGS. 12A to 12E are cross-sectional views showing the cross-sectional structure of FIG. 11 taken along line 12-12 in correspondence with operational states of the key interlock mechanism.
Figure 12B:
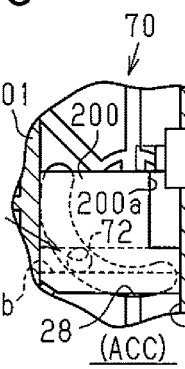
Figure 12C:
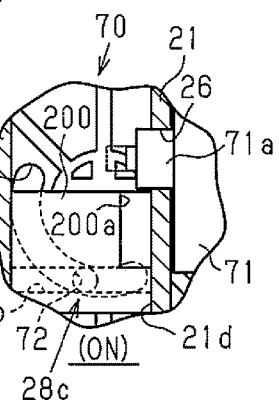
Figure 12D:
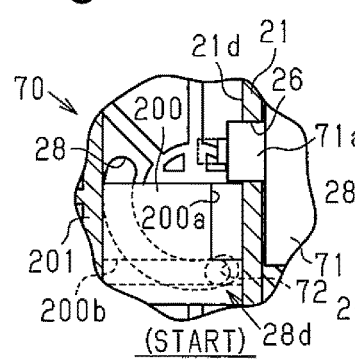
Figure 12E:
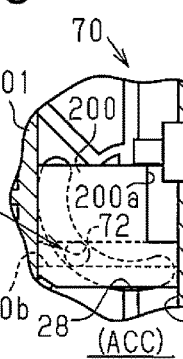

As shown in FIG. 12E, when the plunger 71a is extended, the distal end of the plunger 71a is hooked to the hook 200a.

The lock block 200 moves straight in the connector extension direction as the pin 72 inserted in the pin groove 200b moves. When the IG rotor 40 is rotated, the pin 72 moves along the slide hole 28 of the switch body 21 as moving in the plunger extension direction along the pin groove 200b of the lock block 200. Thus, the movement of the pin 72 moves the lock block 200 in the connector extension direction. In this manner, the pin 72 moves in the pin groove 200b as moving when the IG rotor 40 rotates. Thus, the lock block 200 moves straight. In other words, the pin groove 200b converts the movement of the pin 72 (rotation of the IG rotor 40) to the straight movement of the lock block 200.

The pin groove 200b extends in the plunger extension direction so that the movement of the pin 72 is small when the pin 72 moves to the rotor positions of "ACC", "ON", and "START". That is, in the third embodiment, when the pin 72 moves to the rotor positions of "ACC", "ON", and "START", the movement of the pin 72 in the plunger extension direction is smaller than that in the connector extension direction. Thus, the pin groove 200b extends in the plunger extension direction.

As shown in FIG. 12A, when the rotor position is "LOCK", the pin 72 is located at the first position 28a (upper left end in FIG. 12A) of the slide hole 28. The lock block 200 moves in the connector extension direction to a position where the recess of the hook 200a accommodates the plunger 71a.

As shown in FIG. 12B, when the rotor position is "ACC", the pin 72 is located at the second position 28b of the slide hole 28. The lock block 200 moves in the connector extension direction to where the plunger 71a is located at the most proximate position and can be hooked to the hook 200a.

As shown in FIG. 12C, when the rotor position is "ON", the pin 72 is located at the third position 28c of the slide hole 28. The lock block 200 moves in the connector extension direction to a position where the plunger 71a is slightly separated from the hook 200a.

As shown in FIG. 12D, when the rotor position is "START", the pin 72 is located at the fourth position 28d (lower right in FIG. 12D) of the slide hole 28. The lock block 200 moves in the connector extension direction to a position where the plunger 71a is slightly separated from the hook 200a.

The distance the lock block 200 moves in the connector extension direction is adjusted to be smaller when the IG rotor 40 rotates to "ACC", "ON", and "START" than when the IG rotor 40 rotates between "LOCK" and "ACC".

As indicated by solid lines in FIGS. 12A to 12D, when the vehicle is still, the vehicle controller 80 deactivates the solenoid 71 and retracts the plunger 71a regardless of the rotor position of the IG rotor 40. When the plunger 71a is retracted, the lock block 200 is allowed to move to the "LOCK" rotor position. Thus, the vehicle key can be removed and inserted.

As indicated by broken lines in FIGS. 12B to 12D, when the vehicle is not still, the vehicle controller 80 activates the solenoid 71 to extend the plunger 71a when the IG rotor 40 is at a rotor position other than "LOCK". This restricts the movement of the lock block 200, that is, the rotation of the IG rotor 40.

For example, as shown in FIG. 12E, when the vehicle controller 80 extends the plunger 71a when the rotor position is "ACC", the plunger 71a restricts the movement of the lock block 200 to the "LOCK" rotor position. This results in the key interlock mode that restricts the movement of the pin 72, that is, the rotation of the IG rotor 40 to the "LOCK" rotor position. In the third embodiment, the plunger 71a functions as a removal restriction portion.

The third embodiment has the advantages described below in addition to advantages (1) to (3) and (5) of the first embodiment.

(8) In the key interlock mechanism 70, the pin 72 converts the rotation of the IG rotor 40 to the straight movement of the lock block 200. This structure increases the degree of freedom for designing the structure that prevents the removal of the vehicle key. In addition, the IGSW 20 may be further reduced in size by adjusting the amount of the straight movement of the lock block 200.

(9) The movement amount of the lock block 200 is reduced when the IG rotor 40 rotates to "ACC", "ON" and "START". Thus, the IGSW 20 may be further reduced in size.

It should be apparent to those skilled in the art that the present invention may be embodied in many other specific forms without departing from the scope of the invention. Particularly, it should be understood that the present invention may be embodied in the following forms.

The shape and the structure of the pin 72 may be modified as long as the rotation of the IG rotor 40 can be transmitted. For example, the pin 72 may be formed integrally with the IG rotor 40. In this case, the IG rotor 40 is formed to extend to the end 21b of the switch body 21. In the first embodiment, the pin 72 may be formed integrally with the lock lever 73. Additionally, the cross section of the pin 72 may be D-shaped, trapezoidal, or the like. The pin 72 may be a tetragonal rod.

The key interlock mechanism 70 and the IG rotor 40 may be coupled to the same side of the switch body 21. In this case, it is preferred that the IG rotor 40 have a devised structure (contact structure with the contact portion 23).

In the first embodiment, the lock lever 73 may have any shape as long as the lock lever 73 has a structure in which the lock lever 73 pivots as the pin 72 moves and the plunger 71a restricts the pivoting of the lock lever 73. Alternatively, for example, a rectangular member may be employed instead of the lock lever 73.

In the second embodiment, instead of the sliders 103 and 104, a different structure may be used as long as the movement of the pin 72 can be restricted. For example, instead of the projection 104b of the second slider 104, the plunger 102a of the solenoid 102 may restrict the movement of the pin 72.

In the third embodiment, instead of the lock block 200, a different structure may be used as long as the movement of the pin 72 can be converted to straight movement and the plunger 71a can restrict the movement of the pin 72. For example, a plate-like member may be employed instead of the lock block 200.

In the first and third embodiments, instead of restricting the movement of the lock lever 73 and the lock block 200 by the plunger 71a, the sliders 103 and 104 may be used to restrict the movement in the same manner as the second embodiment. In this case, the connector extension direction may be aligned with the plunger extension direction when the solenoid 71 is coupled even in the first and third embodiments. This limits enlargement of the IGSW 20.

The present examples and embodiments are to be considered as illustrative and not restrictive, and the invention is not to be limited to the details given herein, but may be modified within the scope and equivalence of the appended claims.

What is claimed is:

1. An ignition switch capable of starting and stopping an engine of a vehicle and activating and deactivating an electric component of the vehicle, the ignition switch comprising:
    a rotor into which a vehicle key is insertable;
    a switch body rotationally accommodating the rotor; and
    a key interlock mechanism integrally coupled to the switch body, wherein the key interlock mechanism is configured to prevent removal of the vehicle key when the vehicle is traveling, wherein
    the switch body includes a separation plate that separates an accommodation region of the rotor from an accommodation region of the key interlock mechanism, and
    the key interlock mechanism is coupled to a side of the switch body that is opposite to the rotor across the separation plate.

2. The ignition switch according to claim 1, wherein the switch body includes a contact portion electrically connected to the rotor.

3. The ignition switch according to claim 1, further comprising a transmission that is configured to move integrally with the rotor when the rotor rotates and transmit the rotation of the rotor to the key interlock mechanism, wherein the transmission extends from the rotor through the switch body to the key interlock mechanism and is coupled to the key interlock mechanism.

4. The ignition switch according to claim 3, wherein the key interlock mechanism includes
    a lock coupled to the transmission so as to pivot integrally with the transmission, and
    a removal prevention portion that is configured to prevent removal of the vehicle key by restricting pivoting of the lock.

5. The ignition switch according to claim 4, wherein the switch body includes
    a rotor rotation shaft rotationally supporting the rotor,
    a lock pivot shaft pivotally supporting the lock, and
    the separation plate arranged between the rotor rotation shaft and the lock pivot shaft;
    the separation plate includes a slide hole that guides movement of the transmission;
    the transmission includes a pin that mechanically couples the rotor and the lock through the slide hole;
    the removal prevention portion is a plunger that is configured to move between an extension position and a retraction position in accordance with the rotation of the rotor; and
    the plunger restricts the pivoting of the lock when the plunger is located at the extension position.

6. The ignition switch according to claim 3, wherein the key interlock mechanism includes a removal prevention portion that is configured to prevent the removal of the vehicle key by restricting movement of the transmission.

7. The ignition switch according to claim 6, wherein the switch body includes
    a rotor rotation shaft rotationally supporting the rotor, and
    the separation plate formed integrally with the rotor rotation shaft;
    the separation plate includes a slide hole that is configured to guide the movement of the transmission;
    the transmission includes a pin projecting into the accommodation region of the key interlock mechanism through the slide hole; and
    the removal prevention portion is a restriction member that is configured to move in accordance with the rotation of the rotor between a position where the restriction member restricts movement of the pin and a position where the restriction member allows movement of the pin.

8. The ignition switch according to claim 3, wherein the key interlock mechanism includes
a lock coupled to the transmission so as to move straight when the transmission moves, and
a removal prevention portion that is configured to prevent removal of the vehicle key by restricting straight movement of the lock; and
the lock includes a converter that is configured to convert the movement of the transmission to the straight movement of the lock.

9. The ignition switch according to claim 8, wherein the switch body includes
a rotor rotation shaft rotationally supporting the rotor, and
the separation plate formed integrally with the rotor rotation shaft;
the separation plate includes a slide hole that is configured to guide the movement of the transmission,
the transmission is a pin that mechanically couples the rotor and the lock through the slide hole;
the removal prevention portion is a plunger that is configured to move in accordance with the rotation of the rotor between an extension position and a retraction position, and
the plunger restricts the straight movement of the lock when the plunger is located at the extension position.

* * * * *